United States Patent [19]

Koutonen et al.

[11] Patent Number: 4,463,251

[45] Date of Patent: Jul. 31, 1984

[54] METHOD AND MEANS FOR THE IDENTIFICATION OF A ROLL

[75] Inventors: Pauli Koutonen; Lars-Erik Alanco, both of Järvenpää, Finland

[73] Assignee: Oy Wartsila A.B., Helsinki, Finland

[21] Appl. No.: 387,270

[22] Filed: Jun. 10, 1982

[30] Foreign Application Priority Data

Jun. 17, 1981 [FI] Finland ............................ 811916

[51] Int. Cl.³ ............................................. G06K 7/14
[52] U.S. Cl. .................... 235/470; 235/161; 235/154; 235/167; 235/385
[58] Field of Search .............. 235/454, 467, 464, 462, 235/485, 455, 456, 459, 463, 470, 457, 385, 471

[56] References Cited

U.S. PATENT DOCUMENTS

| | | | |
|---|---|---|---|
| 3,600,556 | 8/1971 | Acker | 235/467 |
| 3,643,068 | 2/1972 | Monan et al. | 235/467 |
| 3,931,524 | 1/1976 | Herrin | 250/566 |
| 3,978,317 | 8/1976 | Yamaguchi et al. | 235/467 |
| 3,988,573 | 10/1976 | Hayosh | 250/555 |
| 4,057,784 | 11/1977 | Tafoya | 340/146.3 F |
| 4,192,452 | 3/1980 | Hashimoto et al. | 235/471 |
| 4,193,540 | 3/1980 | Dougados et al. | 235/454 |
| 4,224,509 | 9/1980 | Cheng | 235/457 |
| 4,250,405 | 2/1981 | Ashcroft et al. | 235/456 |
| 4,333,006 | 7/1982 | Gorin et al. | 235/457 |

FOREIGN PATENT DOCUMENTS 54-140424 10/1979 Japan .................. 235/463

Primary Examiner—A. D. Pellinen
Assistant Examiner—Robert Lev
Attorney, Agent, or Firm—McAulay, Fields, Fisher, Goldstein & Nissen

[57] ABSTRACT

A method for the identification of rolls, in particular big paper rolls, by means of a code attached to or marked on the end surface of the roll. The code comprises several characters located side by side and is read by a combined signal optical beam transmitter-receiver, preferably a laser device, scanning a restricted angle in a plane (8). The scanning is adjusted to extend slightly over the end limits of the code at its both ends and the scanning plane is turned until at least one scanning over the enire code (4) is obtained.

14 Claims, 2 Drawing Figures

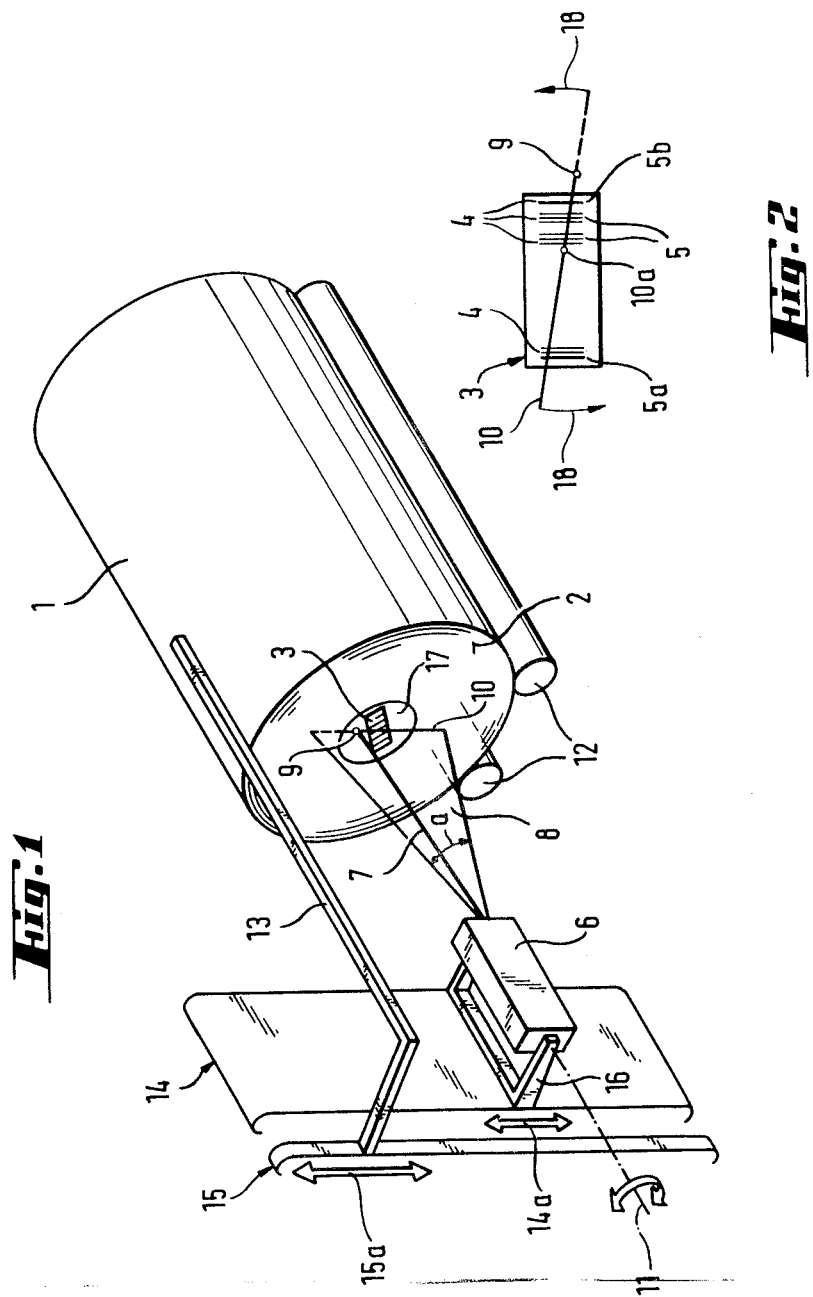

METHOD AND MEANS FOR THE IDENTIFICATION OF A ROLL

BACKGROUND OF THE INVENTION

The invention relates to a method, and to an arrangement for the application of the method, for the identification of rolls, in particular, big paper rolls, by means of a code attached to or marked on the end surface of the roll, which code comprises several code characters located side by side.

Big paper rolls are produced in a paper mill for different deliveries comprising rolls of different axial length, different diameter and/or different weight. Rolls being similar with respect to the properties just mentioned may comprise different paper grades having different density and/or composition. Also the package requirement may vary, for instance, shipping of rolls to overseas customers requires a much more durable package than rolls delivered to nearby customers. In order to avoid delivery delays it is also important to be able to reproduce a roll of a specific character quickly, if the original roll winding has failed or if the roll has been damaged.

In an automatized paper roll production and packaging line, for instance, the roll weight and diameter are measured and the measured values are transferred to the governing and data processing unit of the line. A labelling unit produces an identification label for each roll and attaches it to the end surface of the roll. The label indicates the measured values and possibly also other recorded data identifying the customer and the paper grade of the roll. All data are expressed in the form of a code modified to suit an automatic reader device.

It is suitable to use a so-called bar code formed by a series of stripes. The code is read across the stripes by sensing the value of the code stripes one after another. In order to facilitate the code reading, the label is usually attached to the center of the roll. Nevertheless, there will be variations in the vertical position of the label, because the roll diameters may vary considerably. Another problem is that the scanning plane of the reader has no connection with the random orientation of the label. It is known to eliminate this problem by rotating the roll during code reading by means of scanning all over the roll end surface by means of a narrow, collimated optical beam. Thus, the scanning motion of the beam has to cover the entire end surface of the roll. This is cumbersome, time-consuming and uneconomical. Moreover, roll rotation requires rotation means, which increases the expenses. Rotation of a roll weighing several tons is slow, and slows down the entire roll handling process.

OBJECT AND SUMMARY OF THE INVENTION

The object of the invention is to provide a roll identification method suitable for an automatized roll handling line and means for the application of the method, by means of which roll identification can be made rapidly, accurately and economically.

The object of the invention is realized by using a combined optical beam transmitter-receiver known per se, preferably a laser device, which scans over a restricted angle in a plane. By means of the linear motion of the optical beam, a good alignment of the beam at the label code is obtainable. All the elements of the code are read by arranging the scanning to extend slightly over the code area at both its ends. The time spent in scanning is used economically, since mainly only the area including information is scanned. By turning the scanning plane, so that it crosses the total code, all elements of the code can easily be read.

In a preferred embodiment of the invention, the center of the scanning angle is adjusted to fall between the first and last characters of the code. Then the scanning plane will all the time sweep the code, at least partly. By adjusting the magnitude of the scanning angle so that it corresponds to about twice the width of the code, the scanning will with certainty extend all over the code without being unnecessary wide.

In order to adjust the scanning of a label centrally attached to a roll end, the transmitter-receiver is moved in a vertical direction according to the measured value of the roll diameter, until the midpoint of the scanning is close to the roll axis. A favourable way to carry out this positioning is to combine, in any manner known per se, the vertical movements of the transmitter-receiver and the roll diameter measuring device so that the transmitter-receiver movement is about half the movement of the measuring device. The roll diameter measuring device may also comprise correction means taking into account the influence on the roll center position caused by the horizontal distance between the roll supporting members. In an automatized roll handling plant, the correction can be taken into account by computing and be transmitted to the operational center of the arrangement for exact positioning of the transmitter-receiver.

By turning the scanning plane at an angular speed considerably lower than the angular speed of the scanning, the code reading precision will be unaffected by the scanning plane rotation. The ratio between the scanning angular speed and the rotation speed of the scanning plane should preferably exceed 10:1. This will ensure that several scannings include the total code. The scanning can be terminated after the receiver has received a signal group including the first character as well as the last character of the code. This indicates that necessary information has been received. There might be several readings to confirm the information.

By continuously turning the scanning plane at the most through 180°, a momentary orientation of the plane relative to the code will be such, that all the characters of the code are scanned at least once.

The invention also relates to an arrangement for the application of the described method.

BRIEF DESCRIPTION OF THE DRAWING

The invention will now be described, by way of example, with reference to the accompanying drawing, in which FIG. 1 schematically shows a perspective view of one embodiment of the invention, and FIG. 2 shows a detail of FIG. 1.

DISCLOSURE OF BEST MODE

In the drawing, reference numeral 1 refers to a big paper roll, at the end 2 of which an identification label 3 is attached. Label 3 includes for roll identification a bar code 4 formed by parallel stripes 5. For identifying the fore and tail end of the code, it comprises a first stripe 5a and a last stripe 5b of special character. For reading code 4, there is an optical transmitter-receiver 6, for instance, a laser device transmitting a narrow, collimated beam 7. Beam 7 scans rapidly over a restricted scanning angle a in a plane 8. The contact point 9 of beam 7 on roll 1 moves along a line 10 at the roll end surface 2. Transmitter-receiver 6 is rotatably supported on a carrier 16, so that scanning plane 8 can be turned around an axis 11 lying in said plane. The angular speed of the scanning beam movement continuously to and fro is considerably higher than the turning speed of plane 8 around axis 11. A device 13 for measuring roll diameter is schematically illustrated, as well as means 15 for vertical movement 15a of device 13. The diameter measuring device may, for instance, be a mechanical slide gauge, the rigid jaw of which is the pair of roll supporting drums 12. The distance between the rigid jaw and the movable jaw setting onto the top of the roll mantle is registered electrically and the measured value is transferred to a computer unit governing the process. Transmitter-receiver 6 is adjusted in a vertical direction according to the diameter data of roll 1, so that the center 10a of the scanning angle will come close to the longitudinal axis of roll 1. For vertical movement of measuring device 13 and transmitter-receiver 6 there are displacement means 15 and 14, for instance, chain or belt drives. They can be interconnected, so that movement 14a is about one half of movement 15a. The interconnection members are not shown in the drawing. Conventional means can be used for this purpose.

As a result of the turning of scanning plane 8, scanning line 10 turns around a point 10a, as shown by arrows 18 in FIG. 2. Since the to and fro scanning speed of beam 7 is considerably higher than the turning speed of plane 8, several readings of the code are made. Thereby, at least one reading is carried out so, that code 4 is read in a proper order beginning from the first stripe 5a, then reading data stripes 5, and finally last stripe 5b. The example illustrated in FIG. 2 corresponds mainly to a perpendicular setting of beam 7 against label 3. This is not compulsory for carrying out a reading. If label 3, which is carried by a header 17 attached to the roll core, includes stripe material with a retroreflecting property, that is, giving reflection in the direction of the incoming beam, beam 7 does not have to hit label 3 perpendicularly.

The invention is not limited to the embodiments shown, but several modifications thereof are feasible within the scope of the attached claims. The turning of scanning plane 8 around axis 11, for instance, may also be carried out by varying the optics of transmitter-receiver 6.

We claim:

1. A method for the identification of rolls, in particular stationary big paper rolls, by means of a fixed code attached to or marked on the end surface of the roll, which code comprises several characters located side by side and including the first and last character thereof, said method including the steps of reading said code by means of a movable, combined optical beam transmitter-receiver device, scanning by a single narrow beam, a restricted angle in a plane at a scan angular speed, adjusting said scanning to a central position relative to said roll surface, adjusting said scanning to extend slightly over the end limits of said code at its both ends, and turning at a rotational speed said scanning plane until at least one observed sweep over the entire code is obtained by the reception of a signal including said first and last character.

2. A method according to claim 1, in which the center of said scanning is adjusted to fall between said first and last character of said code and said scanning angle is adjusted to correspond to at the most twice the width of said code.

3. A method according to claim 1 or 2, in which said scanning beam is adjusted vertically by moving said transmitter-receiver device in a vertical direction according to a measured roll diameter, so that the center of said scanning angle will be at or close to the longitudinal axis of the roll carrying said code.

4. A method according to claim 3, utilizing roll diameter measuring means and in which the vertical movement of said transmitter-receiver is arranged to have a given ratio relative to vertical movement of said roll diameter measuring means.

5. A method according to claim 4, in which the movement of said transmitter-receiver is adjusted to be about one half of the vertical movement of said measuring means.

6. A method according to claim 1, 2, 4 or 5 in which said scanning beam has a given scan angular speed and said scanning plane is turned with a rotational speed which in angular speed units is considerably lower than said scan angular speed of said scanning beam.

7. A method according to claim 1, 2, 4 or 5 in which said several characters are parallel stripes and including scanning over said parallel stripes until said transmitter-receiver receives at least one signal group including the first character as well as the last character of said code.

8. A method according to claim 1, 2, 4 or 5 in which said scanning plane is turned through at the most 180°.

9. An arrangement for identification of code-marked rolls, in particular, stationary big paper rolls, said arrangement comprising means for measuring a roll, a movable combined narrow beam transmitter-receiver device for scanning and reading at the same time an entire code applied to the end surface of said roll, said code comprising a plurality of fixed characters located side by side, said arrangement further comprising means for turning the scanning plane of said beam, and means for moving said transmitter-receiver vertically and for governing the vertical movements of the transmitter-receiver in proportion to the roll diameter to keep said transmitter-receiver positioned at or close to the longitudinal axis of said roll.

10. An arrangement according to claim 9, further including a device for turning said transmitter-receiver device and thereby turning said scanning plane, so that said scanning at least once passes all over said code, means for processing the read information, and means for the termination of the scanning process upon reception of a signal group including the first and last character of said code.

11. The method of claim 1, wherein said transmitter-receiver device is a laser.

12. The method of claim 1, wherein the ratio between the scanning angular speed and the rotation speed of the scanning plane exceeds 10:1.

13. The arrangement of claim 9, wherein said transmitter-receiver device is a laser.

14. The arrangement of claim 9, wherein said receiver is rotatably mounted on a carrier.

* * * * *